United States Patent [19]

Kamens

[11] Patent Number: 4,487,208
[45] Date of Patent: Dec. 11, 1984

[54] FAST RESPONSE THERMORESISTIVE TEMPERATURE SENSING PROBE

[75] Inventor: Bruce H. Kamens, Thomaston, Conn.

[73] Assignee: Timex Medical Products Corporation, Waterbury, Conn.

[21] Appl. No.: 459,741

[22] Filed: Jan. 21, 1983

[51] Int. Cl.³ .............................................. A61B 5/00
[52] U.S. Cl. .................................... 128/736; 374/170
[58] Field of Search ................ 128/736; 374/158, 163, 374/170, 208–209

[56] References Cited

U.S. PATENT DOCUMENTS

| | | |
|---|---|---|
| 3,025,706 | 3/1962 | Oppenheim . |
| 3,729,998 | 5/1973 | Mueller et al. . |
| 3,738,173 | 6/1973 | Sato ..................... 374/158 |
| 3,884,219 | 5/1975 | Richardson et al. ........... 128/736 X |
| 3,929,018 | 12/1975 | Turner ................ 374/158 |
| 4,054,057 | 10/1977 | Kluge .................... 374/158 |
| 4,121,574 | 10/1978 | Lester ............... 128/736 X |
| 4,166,451 | 9/1979 | Salera ................... 128/736 |
| 4,174,631 | 11/1979 | Hammerslag . |
| 4,182,313 | 1/1980 | Aslan ................... 128/736 |
| 4,222,391 | 9/1980 | Rawson et al. ..................... 128/736 |
| 4,411,535 | 10/1983 | Schwarzschild ............... 374/208 X |

FOREIGN PATENT DOCUMENTS

| | | | |
|---|---|---|---|
| 2518694 | 11/1976 | Fed. Rep. of Germany ...... 128/736 |
| 2448714 | 10/1980 | France ................................. 128/736 |

Primary Examiner—Lee S. Cohen
Assistant Examiner—Angela D. Sykes
Attorney, Agent, or Firm—William C. Crutcher; Joseph A. Biela

[57] ABSTRACT

A fast response, electronic clinical thermometer for measuring body temperature is disclosed which has a probe that includes a hollow tubular probe body and a thermal sensor assembly having a low thermal mass at the temperature sensing end of the probe body. The thermal sensor assembly includes a temperature sensing element electrically connected to a thin metal plate with good thermal conductivity which is received and supported by the probe body at its temperature sensing end. The probe is sealed off at its temperature sensing end permitting only the metal plate of the thermal sensor assembly and the probe body in the vicinity of the metal plate to make contact with the tissues of the body for measuring temperature. The probe is sealed to provide resistance to contamination during use.

15 Claims, 6 Drawing Figures

FAST RESPONSE THERMORESISTIVE TEMPERATURE SENSING PROBE

BACKGROUND OF THE INVENTION

This invention relates generally to clinical electronic thermometers for measuring body temperature by use of a temperature sensing transducer. More particularly, it relates to an improved electronic thermometer including, as the temperature sensing transducer, a thermistor which has a low thermal mass for providing a fast response time.

Electronic clinical thermometers are generally divided into two categories—steady state and predictive. The steady state or direct reading thermometer provides for a gradual rise to the maximum measurable temperature as does the common mercury thermometer. However, the temperature measurement is obtained in less time than the measurement obtained by the mercury thermometer. The response time usually required for the steady state thermometer is about sixty (60) seconds as opposed to three (3) to four (4) minutes for the mercury device. The predictive electronic clinical thermometer measures the rate of increase in temperature over, typically, ten (10) seconds and thereafter predicts or estimates a final temperature value based on the rate determined during the initial ten second measurement period.

Predictive electronic thermometers, such as the IVAC 811/821 System, which estimate the final temperature, i.e. before the transducer has actually reached a temperature equalized with that of the environment, have been implemented to attempt to reduce the time necessary for obtaining a final temperature reading. This type of thermometer may employ an electronic race circuit or some other type of compensation circuit which attempts to offset the actual measured temperature by a factor intended to compensate for the thermal time constant of the transducer. In the alternative, these thermometers may use numerical techniques provided as software algorithms to a built-in microprocessor to predict final temperature readings. Nevertheless, the problems associated with predicting thermometers are that these compensation arrangements and numerical predicting techniques do not accurately simulate the individually different physiological characteristics and responses of different human beings. These thermometers also present problems in their calibration. Generally, the thermometer is calibrated in an oil or water bath which has a much better thermal conductivity than the mouth or other body cavity. The compensation circuits react differently in oil or water baths rather than in the body cavity of the human being to make accurate calibration for human use difficult or impossible.

Steady state clinical thermometers directly measure temperature without use of compensation or predicting arrangements. Steady state thermometers can be accurately calibrated since the temperature they measure is the same temperature as the physiological environment. The major disadvantage of prior art steady state thermometers is that they require a predetermined time of contact with the environment during which the temperature of the thermometer equalizes with that of the environment.

Many electronic thermometers use thermistors as temperature sensing transducers for measuring body temperature. In clinical thermometers, a thermistor is attached to a probe and the probe is inserted into a body cavity such as the mouth of the human being whose temperature is being measured. Once inserted, the probe must remain in place for a sufficient time to permit the thermistor to be heated to the temperature of its environment, i.e. body tissue. Measuring the temperature before the thermistor (or, more accurately, the probe in the vicinity of the thermistor) has reached a temperature equal to that of the environment will result in an inaccurate, typically low, temperature reading. Probe preheaters have been employed with thermistors to speed the response by raising the local temperature of the probe in the vicinity of the thermistor. This technique has been disclosed in the following patents:

| U.S. PAT. NO. | INVENTOR | ISSUE DATE |
| --- | --- | --- |
| 3,025,706 | Oppenheim | March 20, 1962 |
| 3,729,998 | Mueller et al. | May 1, 1973 |
| 3,485,102 | Glick | December, 23, 1979 |
| 3,893,058 | Keith | July 1, 1975 |
| 3,951,003 | Adams | October 28, 1975 |
| 4,166,451 | Salera | September 4, 1979 |
| 4,133,208 | Parlanti | January 9, 1979 |

The amount of time that the probe must remain in the body cavity depends on the thermal time constant of the thermistor. The thermal time constant is a measure of the time required for a particular object to absorb or expel a quantity of heat and, therefore, represents a measure of the speed with which heat energy can be transferred by the object. The thermal time constant of the thermistor is a function of its thermal mass. The time constant of the thermistor is generally less than the time constant of the probe—on the order of ten (10) times less. However, because the thermistor, as disclosed in the Oppenheim patent for example, is surrounded by the probe, the time required for the thermistor temperature to reach steady state body temperature is dependent upon the thermal time constant of the probe. This probe/thermistor configuration could result in a response time of one (1) minute or more.

A clinical electronic thermometer, designed to overcome problems associated with prior art electronic thermometers such as inaccuracy due to the insulating characteristics of the probe, long thermal time constants and the cooling effect of the mass of the probe on the body tissue, is disclosed in U.S. Pat. No. 4,174,631 which issued to Hammerslag on Nov. 20, 1979. The Hammerslag invention includes a thermocouple having two dissimilar fine metal wires that make direct contact with body tissue for providing a true (not predictive) temperature reading in less than one minute. Specifically, the Hammerslag patent shows a thermocouple (thermoelectric) type transducer having a low thermal mass for providing a fast response which is achieved by supporting the thermocouple leads in a hollow tube of plastic material and causing the thermocouple junction to bridge the open end of the tube so that the thin wires and junction are exposed for direct contact with the tissue of the human being whose body temperature is to be measured. However, since the thermocouple leads are exposed, they are readily subject to damage. Also, because the tube or probe is open-ended, it may become contaminated due to entry of saliva and foreign particles.

Another type of thermometer having exposed leads is shown in U.S. Pat. No. 4,250,751 issued to Holzhacker et al. on Feb. 17, 1981. Another temperature sensing probe is disclosed and claimed in a pending patent application, U.S. Ser. No. 309,667, in the name of Schwarzchild and having common assignee herewith, now U.S. Pat. No. 4,411,535 issued Oct. 25, 1983.

Thermistors have been preferred over thermocouples for providing temperature measurements in the medical environment because they exhibit greater sensitivity in the temperature range of interest and because no reference junction is required as in the thermocouple. Also, when using thermocouples, measurement errors may be caused by, for example, the Peltier effect wherein one thermocouple junction is warmed while the other is cooled. This would not occur in thermistor-based temperature sensing probes.

Accordingly, one object of the invention is to provide an improved fast response clinical electronic thermometer having a probe for insertion into body cavities.

An object of the invention is to provide an improved fast response clinical electronic thermometer which includes both a probe and a thermal sensor assembly within the probe having very low thermal mass.

Another object of the invention is to provide for the thermal sensor assembly to make direct contact with the body tissue in the body cavity for obtaining a fast temperature measurement without the need for compensating arrangements such as probe preheaters.

Another object of the invention is to provide a clinical thermometer that produces an accurate (±0.1° C.) temperature measurement in less than ten (10) seconds once the probe is positioned in the body cavity and makes contact with the body tissue.

Yet another object of the invention is to substantially eliminate the problem of contamination by providing a closed-end probe.

A further object of the invention is to minimize damage by enclosing the temperature sensing element and associated leads within the hollow tube-like probe body. A further object of the invention is to provide an improved construction for an inexpensive clinical thermometer.

SUMMARY OF THE INVENTION

Disclosed and claimed is a fast response, electronic clinical thermometer for measuring body temperature which has a probe that includes a hollow-tubular probe body and which supports a thermal sensor assembly at the temperature sensing end of the probe body. The assembly includes a thin, thermally conductive metal plate, with a small-diameter wire lead connected thereto, electrically connected to a low thermal mass temperature sensing element, with a small-diameter wire lead connected thereto. The wire leads are disposed in the hollow probe and electrically connected to the associated electronic thermometer circuitry.

The tubular probe body is made of insulating plastic material having a low thermal mass at least at its temperature sensing end. The probe has a platform that is radially directed toward the longitudinal axis of the probe body and which has an opening that is larger than the temperature sensing element but smaller than the metal plate. The platform supports the metal plate and the opening in the platform permits the temperature sensing element, which is electrically connected to one side of the metal plate, to extend therethrough toward the inside of the probe body. The probe body also has a flange that substantially surrounds the platform and is crimped toward the platform so as to engage the peripheral edge of the metal plate which is supported on the platform. This clamping of the thermal sensor assembly to the probe body provides a sealed, contaminant-resistant, closed-end probe which permits only the metal plate of the thermal sensor assembly and the probe body substantially in the vicinity of the metal plate to make contact with the tissues of the body for measuring body temperature.

DESCRIPTION OF THE PREFERRED EMBODIMENT

Figure 1:
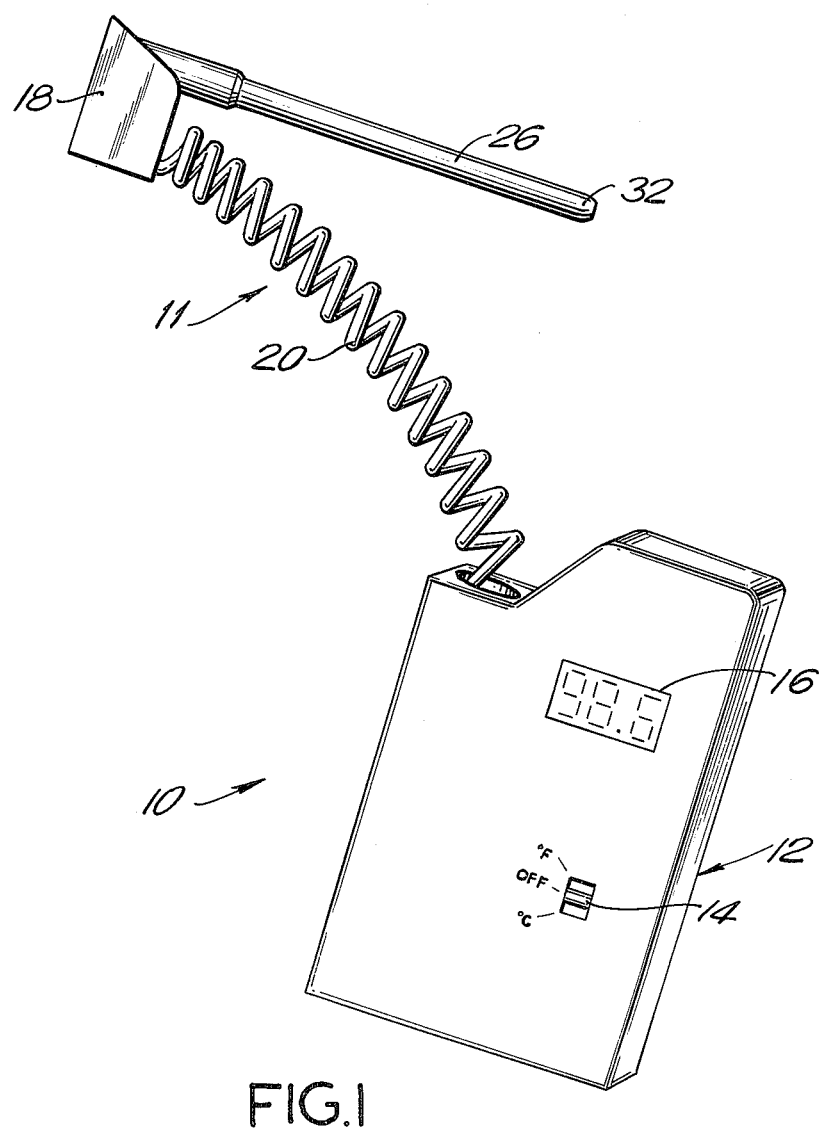
FIG. 1 is a perspective view of the electronic thermometer using the improved probe.

Referring now to FIG. 1, electronic clinical thermometer 10 is shown which includes probe 11 associated with carrying case 12. The carrying case houses the battery and the battery driven electronic circuitry (not shown), operating switch 14 and display 16 adapted to provide a reading of the body temperature measured by probe 11. The probe includes thermal sensor assembly 30, shown in FIGS. 2 through 6, probe body 26 and handle 18 which connects probe body 26 to spring-coil cord 20 wherein both are adapted to nest in carrying case 12. The spring-coil cord connects the electronic circuitry to first and second wire leads, 22 and 24, which are, as shown in FIGS. 2 through 6, electrically connected to thermal sensor assembly 30 as described below. The leads are disposed within hollow tubular probe body 26. Probe body 26, which is connected to handle 18, may be a permanent part of the handle or, preferably, may be adapted for detaching from the handle for replacement with another probe. When the probe is not in use, it and the coil cord are stored in carrying case 12.

Figure 2:
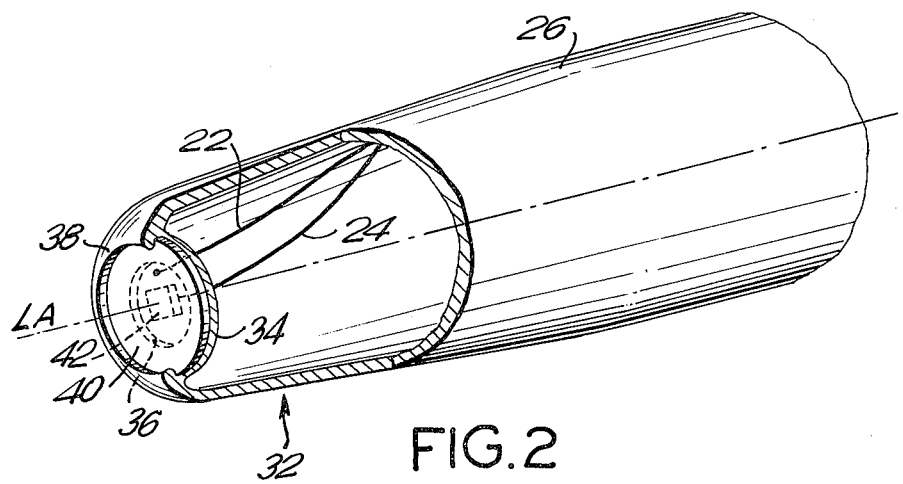
FIG. 2 is a frontal perspective view of a partially cut-away portion of the probe showing the tubular probe body and thermal sensor assembly.
Figure 3:
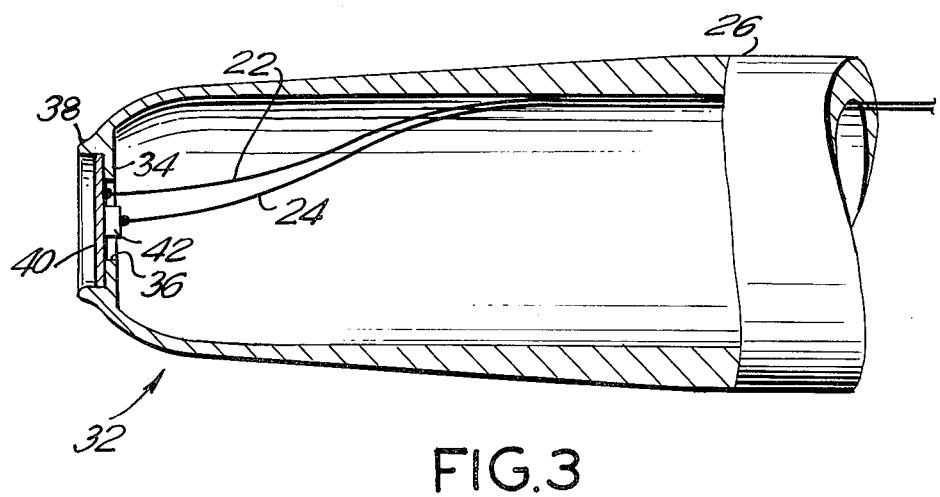
FIGS. 3 and 4 are cross sectional views of the probe.
Figure 4:
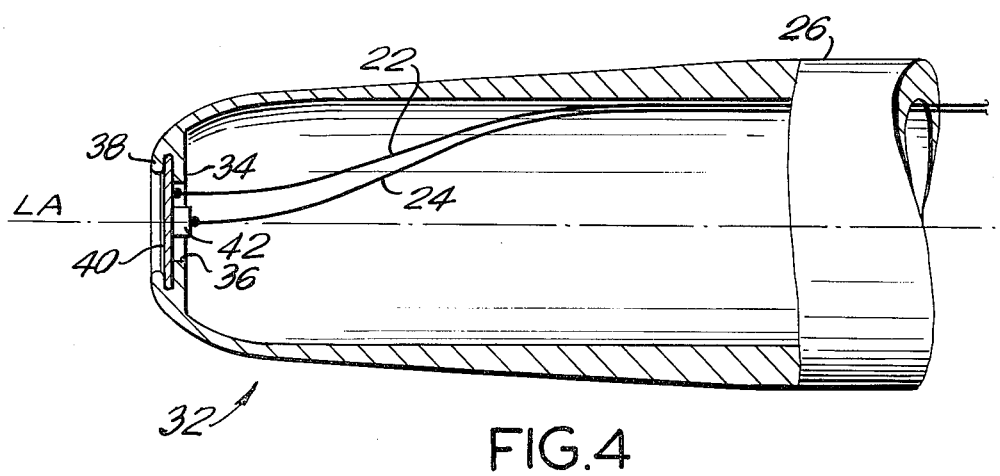

Specifically, probe body 26 includes temperature sensing end 32 as shown in in FIGS. 2 through 4. The probe body, at the temperature sensing end, has a low thermal mass and is made of a plastic having a low thermal conductivity so as to minimize heat transfer from the temperature sensing end toward the handle. Plastics having thermal conductivities on the order of 0.0006 cal/sec/cm./sq.cm./deg.C.° or less are used. Many plastic materials are suitable for this purpose, such as a polycarbonate or a diacetate such as cellulose acetate. High density polyethelenes are peferred. The probe body is made of insulating plastic which has, at the temperature sensing end, platform 34 directed radially inward from the probe body towards the probe body's longitudinal axis, LA, as shown in FIGS. 2 and 4. Platform 34 has opening 36 centrally located therein. The probe body also has, at its temperature sensing end, deformable flange 38 extending outwardly from and along the periphery of platform 34 distal to the center of opening 36. The peripheral flange is deformable for reasons given below.

Figure 6:
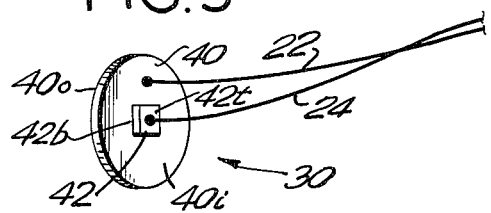
FIG. 6 is a perspective view of the thermal sensor assembly of either embodiment of the probe.

The thermal sensor assembly, shown in FIG. 6, includes thin, thermally conductive metal plate 40, preferably made of coin silver, and a thermoresistive temperature sensing element such as thermistor 42. The temperature sensing element could also be a thermocouple or a semiconductor device such as a diode. Plate 40 has outer surface 40o and inner surface 40i. Thermistor 42 is a hard, ceramic-like device composed of a compressed and sintered mixture of metallic oxides of manganese, nickel, cobalt, copper magnesium, titanium and other metals. The thermistor may be shaped into a bead, rod, disk, washer or other form. If the thermistor were in the shape of a bead, the metal plate could protrude outward at its center away from the probe body forming substantially a bell-shaped structure such that the thermistor bead would be soldered or welded or otherwise secured by epoxy to the inside of the bell-shaped protrusion. However, the metal plate having the bell-shaped protrusion would be clamped to the probe body as described below. In the present embodiment, the thermistor is shaped into a square chip having silver metal deposited on top and bottom square surfaces 42t and 42b, respectively. The thermistor has a low thermal mass (calories/oc) which is a function of its mass and its specific heat or thermal capacity. Wire lead 22 is electrically connected to inner surface 40i of metal plate 40 and wire lead 24 is electrically connected to thermistor 42. Thermistor 42 is substantially centrally positioned on and electrically connected to inner surface 40i of metal plate 40.

Probe body 26 at temperature sensing end 32, is adapted to receive and support thermal sensor assembly 30. Specifically, platform 34, having opening 36 which is larger than thermistor 42 and smaller than metal plate 40, receives and supports at least the peripheral edge of inner surface 40i of metal plate 40. Deformable flange 38 is crimped toward platform 34 and engages the peripheral edge of outer surface 40o of metal plate 40. As a result, the thermal sensor assembly is clamped and sealed to the probe body producing a contaminant-resistant, closed-end probe, at least at the temperature sensing end. In other words, only outer surface 40o of metal plate 40 and at least a portion of probe body 26 is permitted to make contact with the tissues of the body cavity in which the probe is inserted for measuring body temperature.

The plastic probe body, within close proximity to temperature sensing end 32, has a wall thickness of approximately 9 mils. The thickness of the wall may increase from the vicinity of the temperature sensing end toward the handle. However, the temperature sensing end of the probe body must be thin in order to provide for a low thermal mass and yet have sufficient rigidity to support the thermal sensor assembly.

The platform, which extends radially inwardly from the probe body as described above, has a thickness of approximately 7 mils and the flange, which protrudes outwardly from the platform as described above, has a thickness of approximately 1 mil. The height of the flange with respect to the surface of the platform from which it extends is approximately 8 mils. The size of the opening in the platform, if circularly formed, is approximately 50 mils in diameter although it is understood that the opening may be of substantially any shape.

The diameter of the metal plate, if circularly shaped, is approximately 90 mils and the thickness of the plate is approximately 2 mils. It is understood that the metal plate may be of any shape although the thickness is critical to provide for a low thermal mass. Of course the shape and size of the metal plate is determined by the shape and size of the enclosure defined by the flange which extends outwardly substantially along the periphery of the platform as described above. It is critical to the successful operation of the thermometer that the metal plate fit snugly against the flange so as to substantially seal off the hollow interior of the probe body from the exterior environment. As described above, the flange is crimped toward the platform which supports the metal plate thereby clamping the metal plate to the temperature sensing end of the probe body so as to produce a contaminant-resistant, closed-end probe. FIG. 3 shows the flange before crimping. FIG. 4 shows the flange after crimping. The platform is dip coated with a sealant prior to crimping to provide a form-in-place gasket that receives the metal plate to assure that the hollow interior of the probe body is completely sealed off subsequent to crimping the flange toward the platform.

The size of the thermistor is approximately 20 mils on each side and approximately 5 mils thick and was commercially obtained from Ametek. The thermistor, as known in the art, decreases its resistance by approximately four (4) to six (6) percent per degree Celsius (°C.) rise in temperature in accordance with the following non-linear relationship.

$$R = R_o e^{\beta(1/T - 1/T_o)}$$

where R is the resistance of the thermistor at a specific temperature T (in degress Kelvin), $T_o$ is a reference temperature (in degrees Kelvin) and $\beta$ is the thermistor temperature coefficient. In this embodiment, the temperature coefficient is approximately 3940 at least in the temperature range of from 35° C. to 41° C. $R_o$ is approximately 5680 ohms at approximately 38° C. The effect of thermistor self-heating is reduced by limiting the amount of current used in measuring the resistance of the thermistor. The power dissipation of the thermistor is about one (1) milliwatt so as to minimize measurement errors and provide for an accuracy of approximately plus or minus 0.1° C. of the steady state temperature value.

As described above, the thermistor is electrically connected to the metal plate on plate inner surface 40i. Specifically, the thermistor is substantially centrally positioned on the inner surface of the metal plate where it is soldered or welded. The thermistor is also substantially centrally positioned with respect to platform opening 36. The response time, as measured from the moment that the temperature sensing end of the probe comes in contact with the body tissue until substantially the maximum steady state temperature measurement is determined and displayed on display 16, is less than ten seconds. In fact, a three (3) second response time has been experimentally obtained. To ensure a fast response of this magnitude, the thermistor, having substantially the size described above, must be positioned and electrically connected to the metal plate within substantially a 27 mil radius as measured from the center of the metal plate. Furthermore, wire lead 22 must also be electrically connected to the metal plate within the same radial distance from the center of the plate. Wire lead 24 is electrically connected to the exposed, silver coated surface of the thermistor once the thermistor has been connected to the metal plate.

The wire leads, 22 and 24, are small diameter and selected to be of very low thermal mass. The wire leads are #41 magnet wire made of polythermalese or polyurethane. Exposed ends of wire leads 22 and 24 may be welded to the metal plate and thermistor, respectively, as shown in FIG. 6. The fragile wire leads are disposed within and supported by the tubular probe body. The plastic probe body acts as an insulator for the wire leads since they are not exposed to the environment on the outside of the probe body. Each wire lead is secured to the interior wall of the probe body, in the vicinity of the end opposite the temperature sensing end of the probe, by an adhesive such as Hardman's Epocap #3195 epoxy or TRA-CON's BA-FDA-2 epoxy. The epoxy provides strain relief for the wire leads if tension is applied to the wires when the probe is being used.

In summary, thermistor 42, having a low thermal mass, is centrally positioned and electrically connected to the inner surface 40i of metal plate 40. Wire leads 22 and 24 are electrically connected to metal plate 40 and thermistor 42, respectively, to provide for electrical connection of the thermal sensor assembly 40 to the electronic circuitry (not shown).

Inner surface 40i of metal plate 40 is received and supported by platform 34 within the area encompassed by deformable flange 38. The metal plate completely covers opening 36 in platform 34. The opening permits thermistor 42 and wire leads 22 and 24 to extend therethrough into hollow tubular probe body 26 once the metal plate is snugly fitted into position on the platform. The portion of the deformable flange that extends above outer surface 40o of the metal plate 40 is crimped toward the outer surface of the plate for sealingly engaging the peripheral edge of the outer surface of the metal plate. The thermal sensor assembly is now clamped to the temperature sensing end of the probe body thereby forming a contaminant-resistant, closed-end temperature probe which permits only the outer surface of the metal plate of the assembly and, at least, a portion of the probe body to make contact with the tissues of the body for measuring the temperature thereof.

The temperature sensing end of the probe body, after the thermal sensor assembly is received by the platform, but prior to crimping, is dip coated with a sealant, 738 RTV. Thereafter, the flange is crimped as described above by a warm forming process. Coating of the outer surface of the metal plate and flange provides additional protection against contamination if the probe is to be used more than once. The probe is designed to withstand an air pressure of 1.0 psi applied to the end opposite the temperature sensing end. In other words, no air leak is observed at the temperature sensing end of the probe which is submerged in water when the above pressure is applied to the opposite end. Use of epoxies and sealants in the construction of the probe is minimized in order to help produce a fast response thermometer.

Figure 5:
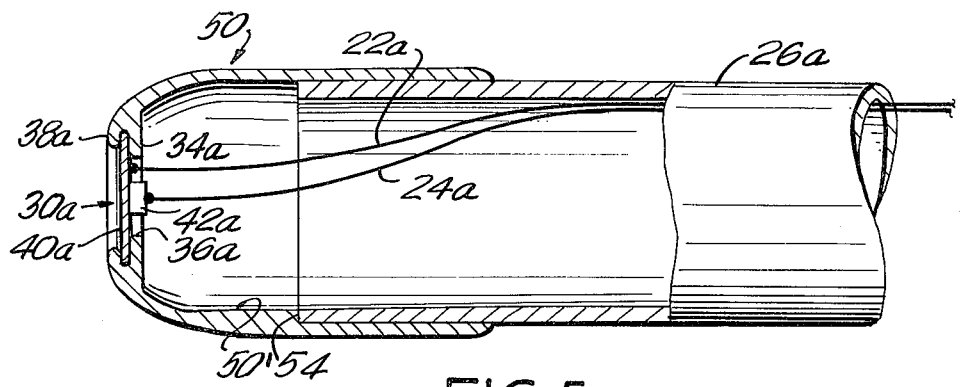
FIG. 5 is a cross-sectional view of another embodiment of the probe.

Another embodiment having temperature sensing end 32a is shown in FIG. 5. This embodiment provides for cup-like member 50 as part of the temperature sensing end of hollow tubular probe body 26a. The cup-like member serves as a cap covering one end of the probe body. The cup-like member includes deformable flange 38a and platform 34a which receives and supports thermal sensor assembly 30a in the manner described above for probe body 26 and thermoresistive assembly 30. Plaftorm 34a has opening 36a. The thermal sensor assembly in this embodiment includes metal plate 40a, thermistor 42a and wire leads 22a and 24a, all positioned and electrically connected in the manner described above for thermal sensor assembly 30. Cup-like member 50 is received by and fits snugly around a portion of probe body 26a in coaxial relation to one another. Cup-like member 50 includes rib 50' which makes contact with leading edge 54 of tubular probe body 26a to restrict the longitudinal movement in one direction of member 50 with respect to probe body 26a.

In another embodiment, the temperature sensing element would be a thermocouple. Both junctions of the thermocouple that would provide for the temperature—dependent potential or contact potential, would be electrically connected, either by soldering or welding, to the metal plate which was described above. The measuring junction of the thermocouple would be connected to one side of the metal plate substantially in the manner described above for the thermistor for providing a contaminant-free thermometer in which the temperature sensing element would also not be easily damaged.

Furthermore, it is obvious to one skilled in the art to combine the thermometer of the present invention to electronic circuitry used in predictive type thermometers. The temperature sensing element may include the thermistor or the thermocouple in the manner described above for each.

While there has been described herein the embodiments of the invention, it is desired to cover in the appended claims all such modifications as fall within the true spirit and scope of the invention.

What is claimed is:

1. A fast response, electronic clinical thermometer for measuring body temperature having a probe with a temperature sensing end comprising:

a thermal sensor assembly including a thin, thermally conductive metal plate member having a peripheral edge and outer and inner surfaces, a temperature sensing element having a low thermal mass and electrically connected and disposed in temperature responsive relationship with said conductive metal plate member on said inner surface, a first small diameter wire lead electrically connected to said inner surface of said metal plate member and a second small diameter wire lead electrically connected to said temperature sensing element, said leads disposed within said probe, and a probe body comprising a hollow tubular member of electrically insulating plastic material having a low thermal mass, said tubular member having a radially inwardly directed platform defining a central opening larger than said temperature sensing element and smaller than said metal plate member, said platform supporting the peripheral edge on said inner surface of said plate member, said tubular member further defining a deformable peripheral flange surrounding said platform and crimped toward said platform to sealingly engage the peripheral edge of said plate member for clamping said assembly to said probe body producing a contaminant-resistant, closed-end probe which permits only said outer surface of said metal plate member, which is in direct conductive contact with said temperature sensing element, and at least a portion of said probe body, to make contact with the tissues of the body for measuring body temperature.

2. The electronic clinical thermometer of claim 1 in which the thickness of said probe body at said temperature sensing end is approximately 9 mils to provide for a fast response.

3. The electronic clinical thermometer of claim 1 in which the thickness of said metal plate member is approximately 2 mils to provide for a fast response.

4. The electronic clinical thermometer of claim 1 in which the size of said temperature sensing element is 20 mils by 20 mils by 5 mils to provide for a fast response.

5. The electronic clinical thermometer of claim 1 in which said temperature sensing element is a thermoresistive element.

6. The electronic clinical thermometer of claim 5 in which said thermoresistive element is a thermistor.

7. The electronic clinical thermometer of claim 6 in which the temperature coefficient of said thermistor is approximately 3940 in the temperature range of 35° C. to 41° C.

8. The electronic clinical thermometer of claim 7 in which said thermistor is welded to said metal plate member to provide for a fast response.

9. The electronic clinical thermometer of claim 8 in which said thermistor is soldered to said metal plate member to provide for a fast response.

10. The electronic clinical thermometer of claim 1 in which said outer surface of said plate member and said flange are coated by a sealant to provide for additional resistance to contamination.

11. The electronic clinical thermometer of claim 10 in which said sealant is 738 RTV.

12. The electronic clinical thermometer of claim 1 in which said flange is crimped by a warm forming process.

13. The electronic clinical thermometer of claim 1 in which said temperature sensing element is a thermocouple.

14. The electronic clinical thermometer of claim 1 in which said temperature sensing element is a semiconductor device.

15. The electronic clinical thermometer of claim 14 in which said semiconductor device is a diode.

* * * * *